(12) United States Patent
Kettner et al.

(10) Patent No.: US 7,556,397 B2
(45) Date of Patent: Jul. 7, 2009

(54) LAMP ASSEMBLY FOR A CONTROLLED ENVIRONMENT CHAMBER

(75) Inventors: Bruce Kettner, Winnipeg (CA); Roger Peters, Winnipeg (CA)

(73) Assignee: Biochambers Incorporated, Winnipeg (CA)

( * ) Notice: Subject to any disclaimer, the term of this patent is extended or adjusted under 35 U.S.C. 154(b) by 0 days.

(21) Appl. No.: 12/127,106

(22) Filed: May 27, 2008

(65) Prior Publication Data

US 2009/0046450 A1 Feb. 19, 2009

Related U.S. Application Data

(60) Provisional application No. 60/955,659, filed on Aug. 14, 2007, provisional application No. 60/971,755, filed on Sep. 12, 2007.

(51) Int. Cl.
*F21V 29/00* (2006.01)
(52) U.S. Cl. .................. 362/218; 362/225; 362/217.09; 362/267; 362/310; 362/373; 362/223
(58) Field of Classification Search ................. 362/218, 362/225, 96, 217.09, 267, 310, 249.01, 249.14, 362/234, 294, 373, 154, 223–224, 217.08, 362/217.15, 217.1, 217.11
See application file for complete search history.

(56) References Cited

U.S. PATENT DOCUMENTS

| 4,344,112 A | * | 8/1982 | Brown ......................... 362/96 |
| 4,864,475 A | * | 9/1989 | Jung ........................... 362/231 |
| 5,726,722 A | * | 3/1998 | Uehara et al. ................. 349/66 |
| 7,396,245 B2 | * | 7/2008 | Huang et al. ................ 439/188 |
| 2006/0146558 A1 | * | 7/2006 | Chen et al. ................... 362/555 |

* cited by examiner

*Primary Examiner*—Thomas M Sember
(74) *Attorney, Agent, or Firm*—Ade & Company Inc.; Kyle R. Satterthwaite; Ryan W. Dupuis

(57) ABSTRACT

A lamp assembly for a controlled environment chamber comprises a frame, a plurality of fluorescent lamps supported on the frame and spaced apart from one another and a plurality of sleeves. Each sleeve is disposed about a respective fluorescent lamp at a distance therefrom to form a space between said sleeve and said respective fluorescent lamp, said sleeve being sealed about said respective fluorescent lamp to prevent air from outside said sleeve from reaching said respective fluorescent lamp. The sleeves are spaced apart to allow airflow therebetween. With the space between each sleeve and the respective lamp being fluidly isolated from air surrounding the sleeve, the light intensity output of the lamp is not as susceptible to reduction under temperature fluctuation in the chamber interior outside the sleeves, while said air remains free to flow between the lamps from one side of the lamp assembly to the other.

20 Claims, 2 Drawing Sheets

LAMP ASSEMBLY FOR A CONTROLLED ENVIRONMENT CHAMBER

This application claims the benefit under 35 U.S.C. 119(e) of U.S. provisional application Ser. No. 60/955,659, filed Aug. 14, 2007, and U.S. provisional application Ser. No. 60/971,755, filed Sep. 12, 2007.

FIELD OF THE INVENTION

This invention relates generally to controlled environment chambers and more particularly to a lamp assembly for such a chamber that helps maintain the temperature of air in which bulbs of the lamp assembly operate without preventing airflow through the lamp assembly.

BACKGROUND OF THE INVENTION

Controlled environment chambers are used in fields of research where experimental subjects, for example plants, need to be kept within a controlled environment where conditions such as light, temperature, humidity and airflow must be carefully controlled to obtain reliable results.

Fluorescent lighting is commonly used within controlled environment chambers. T5 fluorescent lamps are an example of a desirable bulb for controlled environment chambers due to their relatively small cross-sectional size, relatively high level of efficiency and relatively high intensity of light output. However, all fluorescent lights, T5 in particular, are sensitive to ambient air temperature. A less than ideal ambient air temperature results in lower light output, particularly at lower temperatures (10° C. and lower). In order to maintain consistent light output at all over the wide range of temperatures that may be desirable in the context of a controlled environment chamber, the bulb temperature must also be consistent.

Traditionally relatively stable light output has been achieved by placing a transparent barrier between the compartment containing the bulbs, sometimes called a lamploft or light canopy, and the growth area. A separate refrigeration system maintains the appropriate temperature inside the lamploft to maintain optimal light output. However, this is not possible in all chambers. Growth chambers, for example, require vertical airflow through the light canopy making it undesirable to place a barrier in front of the lights.

For the forgoing reasons, it is desirable to provide a lamp assembly for use within a controlled environment chamber that can impede temperature changes in the air surrounding its fluorescent bulbs without preventing airflow through the assembly.

SUMMARY OF THE INVENTION

According to a first aspect of the invention there is provided a lamp assembly for a controlled environment chamber, the lamp assembly comprising:

a frame;

a plurality of fluorescent lamps supported on the frame and spaced apart from one another; and a plurality of sleeves, each sleeve being disposed about a respective fluorescent lamp at a distance therefrom to form a space between said sleeve and said respective fluorescent lamp, said sleeve being sealed about said respective fluorescent lamp to prevent air from outside said sleeve from reaching said respective fluorescent lamp;

the plurality of sleeves being spaced apart to allow airflow therebetween.

Preferably each fluorescent lamp comprises a linearly extending cylindrical lamp tube.

Preferably each sleeve comprises a linearly extending sleeve tube.

Preferably each sleeve is cylindrical about the respective lamp.

Preferably each sleeve is closed at opposite ends thereof by end caps through which the respective lamp extends.

Preferably the end caps has two apertures extending therethrough and the respective lamp comprises two electrical connectors at each end thereof extending through said two apertures.

Preferably the frame supports electrical connections engaged to the plurality of fluorescent lamps to deliver electricity thereto.

Preferably each electrical connection is wired to a ballast supported on the frame.

Preferably the plurality of fluorescent lamps is arranged in at least one array, each array having lamps disposed in a parallel side-by-side arrangement.

The at least one array may comprise first and second arrays, the lamps of the first and second arrays being parallel with the lamps of the first array extending away from ends of the lamps of the second array from proximate said ends.

A portion of each sleeve may comprise a reflective surface to redirect light from the respective lamp.

Preferably each sleeve comprises plastic.

Preferably each sleeve comprises polycarbonate.

According to a second aspect of the invention there is provided a controlled environment chamber comprising:

a substantially vertical wall structure defining an interior of the controlled environment chamber;

a lamp assembly mounted within the interior of the controlled environment chamber and comprising:

a frame;

a plurality of fluorescent lamps supported on the frame and spaced apart from one another; and a plurality of sleeves, each sleeve being disposed about a respective fluorescent lamp at a distance therefrom to form a space between said sleeve and said respective fluorescent lamp, said sleeve being sealed about said respective fluorescent lamp to prevent air from outside said sleeve from reaching said respective fluorescent lamp;

the plurality of sleeves being spaced apart to allow airflow therebetween.

Preferably the lamp assembly is mounted to extend substantially horizontally across said interior.

The lamp assembly is movably mounted within said controlled environment chamber for upward and downward movement relative to the wall structure within the interior defined thereby.

BRIEF DESCRIPTION OF THE DRAWINGS

In the accompanying drawings, which illustrate an exemplary embodiment of the present invention:

FIG. 5 is a perspective view of the end cap of the sleeve of FIG. 2.

DETAILED DESCRIPTION

Figure 1:
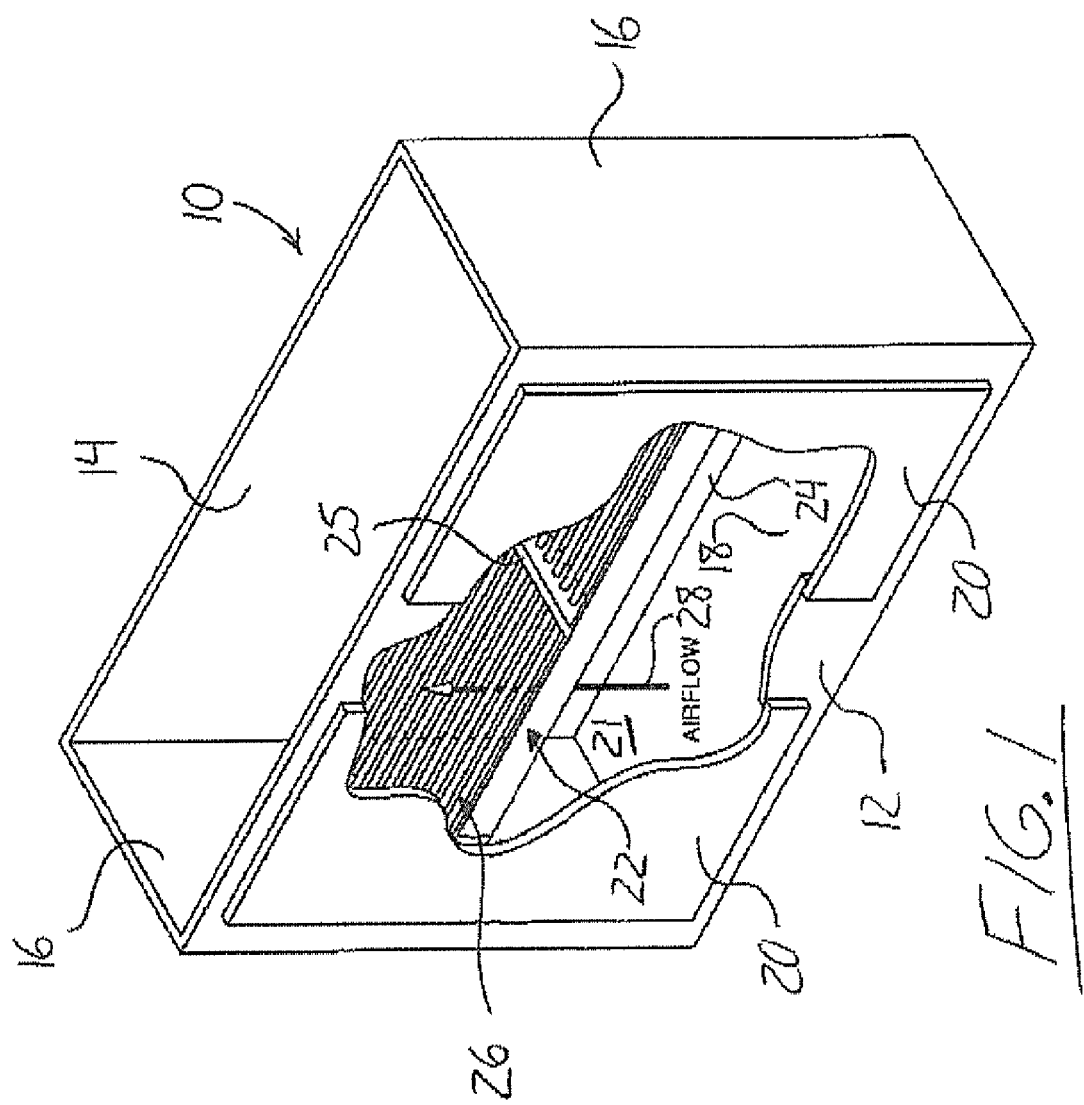
FIG. 1 is a schematic perspective view of a controlled environment chamber with a lamp assembly in accordance with the present invention.

FIG. 1 shows a controlled environment chamber 10 having a front wall 12, a rear wall 14 and two sides walls 16 extending vertically upward from a floor 18. Two openings are provided in the front wall 12, each with a respective door 20 pivotally mounted to the front wall 12 to cooperate with the walls to enclose the interior 21 of the chamber with the doors closed. The openings in the front wall 12 are provided symmetrically about a vertically extending centre axis of the front walls 12 such opening of each door 20 grants easy access to a respective side of the chamber's interior.

A lamp assembly 22 is supported within the interior 21 of the chamber 10 to extend horizontally thereacross at a height above the floor 18 and is mounted in an adjustable manner known to those of skill in the art to allow the height of the lamp assembly 22 to be selected by upward and downward movement of the vertically displaceable lamp assembly. This allows, for example, the lamp assembly 22 to be raised as a plant growing within the chamber interior 21 upward from the floor 18 increased in height. As is also known to those of skill in the art, the lamp assembly 22 comprises a frame 24 made up of front and rear members disposed proximate and extending along the front and rear walls 12, 14 of the chamber 10 and interconnected at their opposite ends and center by cross members. This defines two rectangular spaces on opposite sides of the center cross member 25 each housing a respective array 26 of fluorescent lamps. The frame members contain the electrical system, including sockets for electrical connection of the lamps and ballasts for the regulation of current therethrough, for operation of the lamps when the system is connected to a suitable power source as known to those of skill in the art.

As shown in FIG. 1, the lamp assembly 22 of the present invention allows vertical airflow, as represented schematically by arrow 28, through the lamp assembly. At the same time, the lamp assembly prevents direct exposure of the lamps to this airflow as explained herein below.

Figure 2:
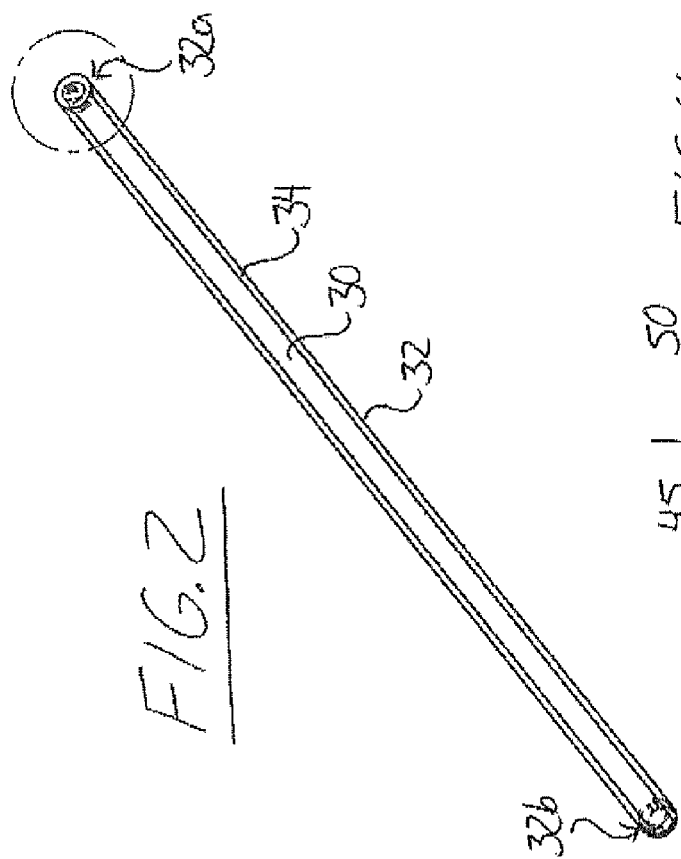
FIG. 2 is a perspective view of a fluorescent lamp and a respective sleeve from the lamp assembly of FIG. 1.

As shown in FIG. 2, each fluorescent lamp 30 is concentrically surrounded by a respective transparent sleeve 32 defined by a round cylindrical tube of polycarbonate disposed concentrically about the round cylindrical lamp 30 along nearly the entire length thereof. The inner diameter of sleeve 32 exceeds the outer diameter that of the lamp 30 so as to define a radial or annular space 34 between them.

Figure 3:
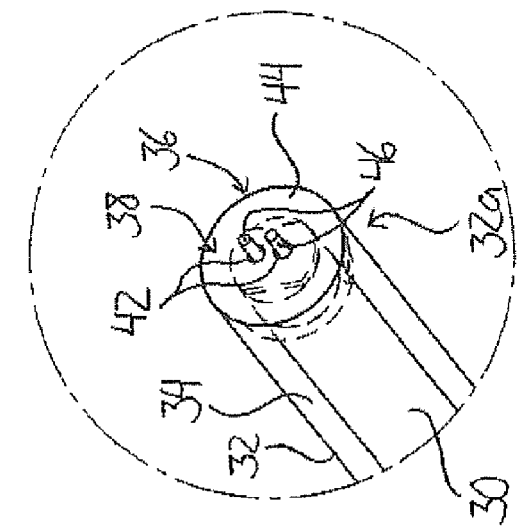
FIG. 3 is a close-up perspective view of an end of the fluorescent lamp and sleeve of FIG. 2 showing an end cap of the sleeve.
Figure 3:
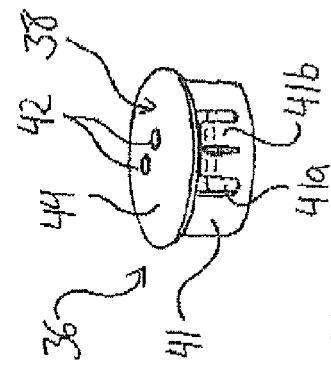

At one end 32a of the sleeve 32, best shown in FIG. 3, an end cap 36 is provided to close access to the annular space 34 between the lamp 30 and the sleeve 32 at the open end 32a thereof. The end cap 36 is provided in the form a conventional tubing plug having a circular head 38 projecting radially outward from the common central axis of the sleeve 32 and the lamp 30 to extend beyond the inner surface 40 of the sleeve 32. A hollow stem 41 of round annular cross section projects normally from the head 38 into the sleeve 32 concentrically therewith. The annular wall projecting normally from the head 38 to define the stem or collar 41 has openings therein extending through it at diametrically opposite positions about its circumference or periphery. As shown in FIG. 5, each opening 41a extends from proximate the head 38 toward, but not quite reaching, the end of the stem 41 opposite the head. Each opening 41a has one or more tabs 41b extending into the opening 41a from the end thereof opposite head 38 generally along the axis about which the annular wall of the stem extends toward the opposite end of the opening nearest the head 38. Each tab 41b is integral with the annular wall of the stem 41 at the end of the opening 41a from which it projects, and is shaped to project radially outward from the annular wall at the free end of the tab opposite the integral connection to the annular wall at the end of the opening 41a opposite the head 38. Each tab is flexible and resiliently biased to so project somewhat radially outward past the outer surface of the annular wall at its fee distal end. When the end cap 36 is installed on the end of the sleeve 32 by inserting the stem 41 into the open end thereof, the free distal ends of the tabs 41b are forced slightly inward into the hollow center of the stem 41 through the openings 41a due to sizing of the sleeve to fit snugly against the annular wall of the stem. The outward biasing of the resilient tabs exerts pressure against the inner surface of the hollow cylindrical sleeve, this frictional engagement acting to hold the end cap in place at the end of the sleeve. The radially outward portion of the head 38 projecting beyond the periphery of the stem 41 over the flat annular end face of the sleeve sits flush thereagainst to seal off the interior of the sleeve, and the bulb therein, from the surrounding environment.

Two parallel apertures 42 extend through the head 38 of the end cap 36 from the outer face 44 thereof to the hollow interior of the stem 40. The inner diameter of the hollow stem 40 is sufficient to allow passage of the end of the fluorescent lamp 30 thereinto such that the two contact pins 46 projecting from the end of the lamp 30 extend through the accordingly spaced apertures 42 to reach past the now closed end of the sleeve 32.

Figure 4:
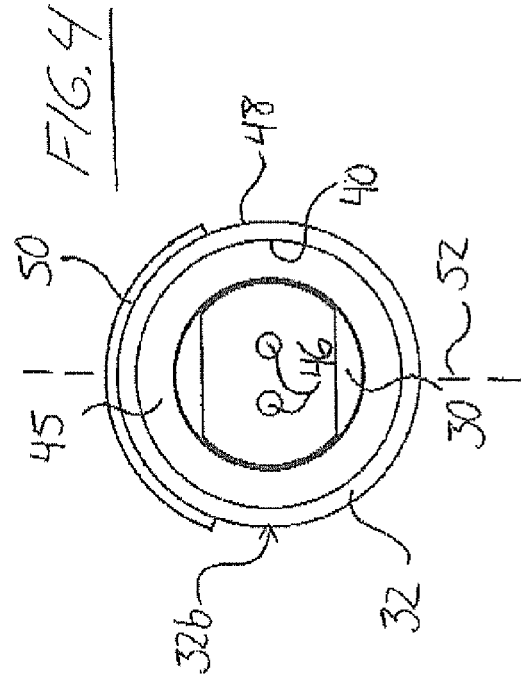
FIG. 4 is an end view of the fluorescent lamp and sleeve of FIG. 2 from an end thereof opposite the end shown in FIG. 3.

FIG. 4 shows an end 32b of the sleeve 32 opposite the end cap 36. Here, a bushing sleeve 45 is fitted between the inner surface of the sleeve 32 and the outer surface of the fluorescent lamp 30, closing the annular or radial space between the lamp and the sleeve but not closing off the entire open end of the sleeve like the end cap. The allows the lamp or bulb to be changed without the removal of an end cap, as it can be slid in and out of the open bushing sleeve having an inner diameter approximately equal to the outer diameter of the lamp. The bushing allows rotation of the lamp relative to the sleeve to position the pins 46 at the capped end of the sleeve for alignment with the apertures 42 in the head 38 of the end cap 36. Once the pins 46 are fitted through the apertures, rotation of the lamp is prevented without withdrawal of the lamp through the bushing-equipped open end of the sleeve. 32

Pressed into place, the bushing and the end cap serve two purposes. Firstly, they seal the sleeve 32 about the lamp 30 so that air from outside the sleeve cannot reach the annular space 34 between the sleeve 32 and the lamp 30, thereby fluidly isolating the lamp 30 from the ambient air surrounding the sleeve 32. Secondly, the fitting of the lamp or bulb within the bushing sleeve with the head 36 of the end cap positioned about each of the contact pins 46 extending through the apertures 42 acts to support the lamp 30 concentrically within the sleeve 32 to maintain the annular space 34. With the lamp 30 so sealed from exposure to air outside the sleeve 32 within the interior 21 of the chamber 10, it is not directly exposed to fluctuations in the temperature of this air and therefore maintains a more consistent temperature, and thus outputs more consistent light intensity. Meanwhile, as shown in FIG. 1, the spacing between the lamps and the size of the sleeves 34 relative to the lamps are such that space is left between the sleeves to allow airflow vertically between the sleeves from one side of the lamp assembly 22 to the other.

Under exposure to heat generated by operation of the fluorescent lamp 30, the sleeve 30 may undergo thermal expansion causing its inner diameter to increase beyond a size capable of providing an interference fit with the stem of the end cap 36. To prevent the end cap 36 from becoming loose or dislodged from the end of the sleeve 32, it is secured to the sleeve, for example by a suitable adhesive such as glue fixing a face of the head 38 of the end cap 36 opposite the outer face 44 to the annular end face of the sleeve engaged flush against it. It should be appreciated that the end cap 36 may be secured to the sleeve by other known fasteners and that so securing the end cap acts in turn to help maintain the fluorescent bulb 30 in a fixed position relative to the sleeve disposed thereabout. It should also be appreciated that the end caps may have a structure other than that shown in the figures and described herein above. For example, rather than a hollow stem extending from the outer face 44 into the sleeve 32, the end cap may instead have an end face larger than the outer diameter of the sleeve 32 and a collar or hollow stem of greater diameter than that of the illustrated embodiment projecting from the end face 44 over, rather than into, the end of the sleeve 32 for an interference fit with an outer surface 48 thereof. Alternatively, end caps may be replaced by o-ring type seals fixed to one of the bulb or the sleeve proximate ends of the sleeve to fill the annular space between the bulb and sleeve to seal isolate the air disposed therein from that surrounding the sleeve.

As shown in FIG. 4, a reflective coating 50 may be provided on a portion of the sleeve 32 to redirect light emitted by the lamp 30. In the illustrated embodiment, the reflective coating 50 is disposed over an upper portion of the cylindrical sleeve 32, the upper portion covered by the coating being symmetrical about a vertical plane extending along the central longitudinal axis of the cylindrical lamp and spanning no more than 180 degrees along the circumference thereof. With the reflective coating so situated, light emitted upward from the lamp hits the reflective coating 50 and is reflected downward. In the controlled environment chamber of FIG. 1, this redirection of light reduces energy waste by increasing the percentage of the light emitted from the lamps 30 that is directed downward toward samples, for example plants, (not shown) disposed beneath the lamp assembly.

The illustrated embodiment features T5 fluorescent lamps, which are relatively compact with an outer diameter of ⅝-inch, and polycarbonate sleeves of 1-inch outer diameter and ⅞-inch inner diameter to create a ⅛-inch annular gap between the bulb and the sleeve. It should be appreciated that the relative sizing of the sleeve and lamp may be varied within the scope of the present invention and that lamps of different sizes may be used. Other types of lamps or bulbs may be equipped with electrical connectors other than the bi-pins shown in the illustrated embodiment, and the specific design of the sealing of the capped end of the sleeve may accordingly be modified from the specific end cap structure shown in the illustrated embodiments. Most lamps feature some type of non-concentric feature on the end of the bulb that can be used as a key to block rotation of the bulb relative to the sleeve when engaged with an aperture or keyway defined by the sleeve closure or end cap. Furthermore, the sleeve disposed about the lamp need not have the same cross-sectional shape thereas in order to in order to fluidly isolate the air immediately surrounding the lamp from that outside the sleeve in the controlled environment chamber. The sleeves are not limited to being cylindrical, so long as they are hollow to receive the lamps therein and arranged to seal around the lamps to prevent exposure to ambient air outside the sleeves while being spaced apart from one another to allow flow of the ambient air therebetween. From this, it should be appreciated that neither the lamps nor the sleeves need be of the linearly extending round cylindrical structure shown in the illustrated embodiment, but that lamps of this shape are certainly commonly used in controlled environment chambers.

In the illustrated embodiment, the lamp assembly 22 is supported horizontally within the controlled environment chamber with the lamps arranged in two arrays 26 disposed end-to-end on opposite sides of the center cross member 25 extending from proximate the front wall 12 to proximate the rear wall 14 between the doors 20. In this arrangement, the lamps 30 are all extending parallel to one another with the lamps of one array generally extending from the ends of lamps in the other array. In each array, spacing between any two adjacent lamp/sleeve combinations is equal to promote airflow through the lamp assembly equally thereacross. It should be appreciated that other arrangements may be provided wherein the lamp/sleeve combinations are maintained in a spaced apart manner to allow airflow therepast, for example a frame may be oriented to support a plurality of lamps in a vertically extending manner while allowing horizontal airflow within the interior of the controlled environment chamber.

In testing, polycarbonate sleeves have been able to significantly improve the ability to retain constant light output through temperature fluctuations relative to lamps directly exposed to ambient air within the chamber. It should be appreciated that other transparent materials, including other plastics, may be used to provide the same benefits. Placing a clear plastic sleeve over the bulb holds a small blanket of warm air around the bulb to keep the bulb temperature above a minimum even at lower ambient temperatures.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A lamp assembly for a controlled environment chamber, the lamp assembly comprising:
   a frame;
   a plurality of fluorescent lamps supported on the frame and spaced apart from one another; and
   a plurality of sleeves, each sleeve being disposed about a respective fluorescent lamp at a distance therefrom to form a space between said sleeve and said respective fluorescent lamp, said sleeve being sealed about said respective fluorescent lamp to prevent air from outside said sleeve from reaching said respective fluorescent lamp;
   the plurality of sleeves being spaced apart to allow airflow therebetween.

2. The lamp assembly according to claim 1 wherein each fluorescent lamp comprises a linearly extending cylindrical lamp tube.

3. The lamp assembly according to claim 1 wherein each sleeve comprises a linearly extending sleeve tube.

4. The lamp assembly according to claim 1 wherein each sleeve is cylindrical about the respective lamp.

5. The lamp assembly according to claim 1 wherein each sleeve is closed at opposite ends thereof by end caps through which the respective lamp extends.

6. The lamp assembly according to claim 5 wherein each of the end caps has two apertures extending therethrough and the respective lamp comprises two electrical connectors at each end thereof extending through said two apertures.

7. The lamp assembly according to claim 1 wherein the frame supports electrical connections engaged to the plurality of fluorescent lamps to deliver electricity thereto.

8. The lamp assembly according to claim 7 wherein each electrical connection is wired to a ballast supported on the frame.

9. The lamp assembly according to claim 1 wherein the plurality of fluorescent lamps are arranged in at least one array, each array having lamps disposed in a parallel side-by-side arrangement.

10. The lamp assembly according to claim 9 wherein the at least one array comprises first and second arrays, the lamps of the first and second arrays being parallel with the lamps of the first array extending away from ends of the lamps of the second array from proximate said ends.

11. The lamp assembly according to claim 1 wherein a portion of each sleeve comprises a reflective surface to redirect light from the respective lamp.

12. The lamp assembly according to claim 1 wherein each sleeve comprises plastic.

13. The lamp assembly according to claim 1 wherein each sleeve comprises polycarbonate.

14. A controlled environment chamber comprising:
a substantially vertical wall structure defining an interior of the controlled environment chamber;
a lamp assembly mounted within the interior of the controlled environment chamber and comprising:
a frame;
a plurality of fluorescent lamps supported on the frame and spaced apart from one another; and
a plurality of sleeves, each sleeve being disposed about a respective fluorescent lamp at a distance therefrom to form a space between said sleeve and said respective fluorescent lamp, said sleeve being sealed about said respective fluorescent lamp to prevent air from outside said sleeve from reaching said respective fluorescent lamp;
the plurality of sleeves being spaced apart to allow airflow therebetween.

15. The controlled environment chamber according to claim 14 wherein the lamp assembly is mounted to extend substantially horizontally across said interior.

16. The controlled environment chamber according to claim 15 wherein the lamp assembly is movably mounted within said controlled environment chamber for upward and downward movement relative to the wall structure within the interior defined thereby.

17. The controlled environment chamber according to claim 14 wherein each sleeve is closed at opposite ends thereof by end caps through which the respective lamp extends.

18. The controlled environment chamber according to claim 17 wherein each of the end caps has two apertures extending therethrough and the respective lamp comprises two electrical connectors at each end thereof extending through said two apertures.

19. The controlled environment chamber according to claim 14 wherein the plurality of fluorescent lamps are arranged in at least one array, each array having lamps disposed in a parallel side-by-side arrangement.

20. The controlled environment chamber according to claim 19 wherein the at least one array comprises first and second arrays, the lamps of the first and second arrays being parallel with the lamps of the first array extending away from ends of the lamps of the second array from proximate said ends.

* * * * *